INVENTOR.
ROBERT K. HOPKINS
BY
Virgil F. Davies
ATTORNEY

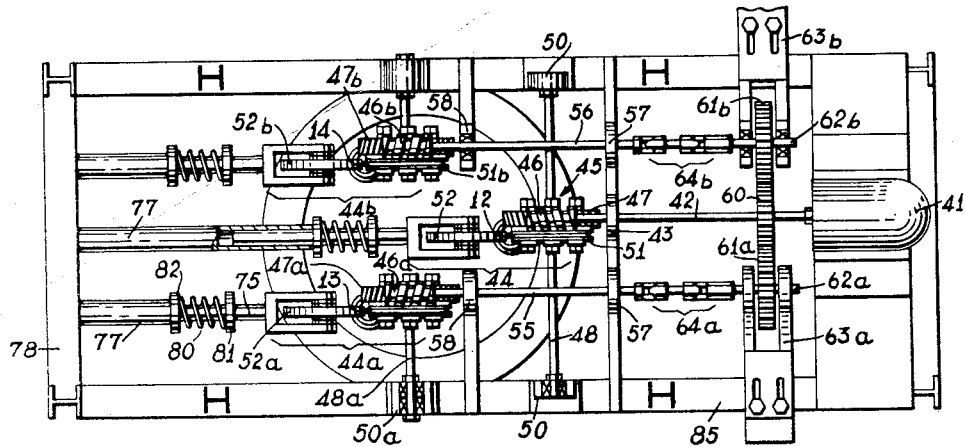
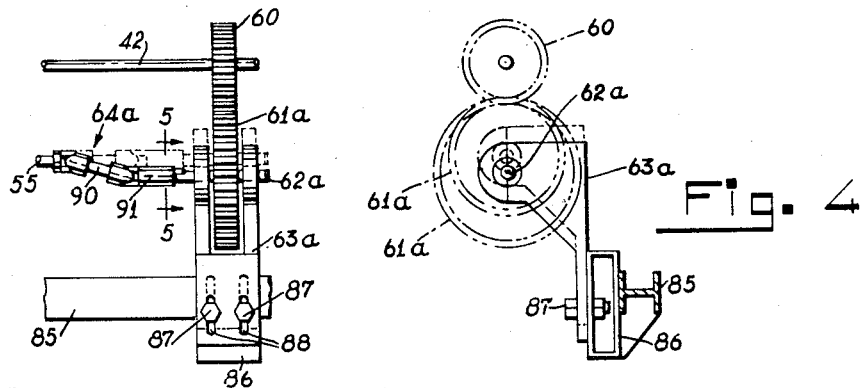
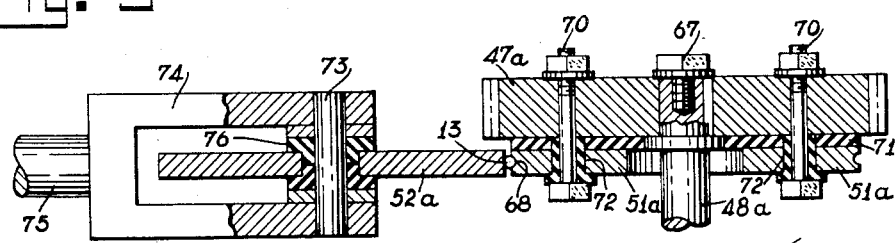

Patented Dec. 5, 1950

2,532,914

UNITED STATES PATENT OFFICE 2,532,914

APPARATUS FOR PRODUCING ALLOY INGOTS

Robert K. Hopkins, Staten Island, N. Y., assignor to The M. W. Kellogg Company, Jersey City, N. J., a corporation of Delaware Application July 14, 1949, Serial No. 104,774

6 Claims. (Cl. 314—80)

The present invention relates to the art of producing metals by the fusing action of flux submerged electric current discharges.

Metal can be produced by dipping a plurality of metal wires or rods containing base ingredients of the metal to be produced into a body of flux and employing said wires as consumable electrodes to discharge electric current therefrom beneath the surface of said flux. This results in the generation of sufficient heat to melt progressively the wires and in the deposition of the molten metal as it is produced, beneath the surface of the flux and into a mold, where it will be progressively solidified and cast into an ingot or body of the desired shape and analysis.

As the electrode wires are consumed, they must be continuously fed endwise towards the fusing zone beneath the surface of the flux to maintain continuous current discharge of the desired characteristics. At the same time, the receptacle or mold in which the fused metal is deposited must be moved relative to the wires, to compensate for the progressive increase in the depth of the deposited metal.

The electrode wires are of different composition according to the make-up of the metal to be produced, and these must be fed at relative rates into the fusing zone, according to the desired quantitive analysis of said metal.

One object of the present invention is to provide a new and improved apparatus for progressively producing metals of desired analysis by the fusing action of flux submerged electric current discharges upon consumable electrodes containing the base ingredients of the metals to be produced.

Another object is to provide an apparatus of the character described for feeding multiple electrodes at predetermined relative rates into the fusing zone as they are consumed, and for maintaining automatically said relative feed rates, regardless of the rate of production of the metal.

A further object is to provide an apparatus of the character described, having means by which the relative rates of feeding of the multiple electrode wires may be selectively adjusted.

In carrying out certain features of the present invention, a single motor is provided for feeding all of the consumable electrodes in the form of wires or rods at predetermined relative rates towards the fusing zone beneath the surface of the flux. For that purpose, there are provided in the drives between the single motor and the electrode wires, transmissions having their speed ratios related according to the relative rates of feed of the wires desired. These relative rates of feed depend on the desired analysis of the metal to be produced and are maintained substantially constant regardless of the speed of the drive motor.

As an additional feature, the drive motor is automatically controlled in accordance with the desired feed rate of at least one of the electrode wires, while the relative feed rates of the wires are maintained substantially constant. This desired feed rate is automatically controlled from a characteristic of the current discharge, such as voltage, to maintain this characteristic substantially constant. This control, in turn, regulates the rate of production of the metal.

As an additional feature, the transmissions in the drives between the drive motor and some of the electrode wires are constructed and arranged to permit them to be changed and the relative speed ratios of the drives to be varied thereby, according to the relative feed ratios of said wires desired.

Various other objects, features and advantages of the present invention are apparent from the following description and from the accompanying drawings, in which:

Fig. 2 is a section of the apparatus taken approximately along the lines 2—2 of Fig. 1;

Fig. 3 is a top plan view of a portion of the apparatus, and shows particularly the transmission to one of the wires in the set-up in Figs. 1 and 2 replaced by a transmission with a different speed ratio;

Fig. 4 is a side elevation of the transmission mounting of Fig. 3, but showing in dot and dash lines the positions assumed by two interchangeable transmissions of different speed ratios;

Fig. 5 is a detail section taken on the lines 5—5 of Fig. 3, but on an enlarged scale; and Fig. 6 is a detail section taken on lines 6—6 of Fig. 1, but on an enlarged scale.

Figure 1:
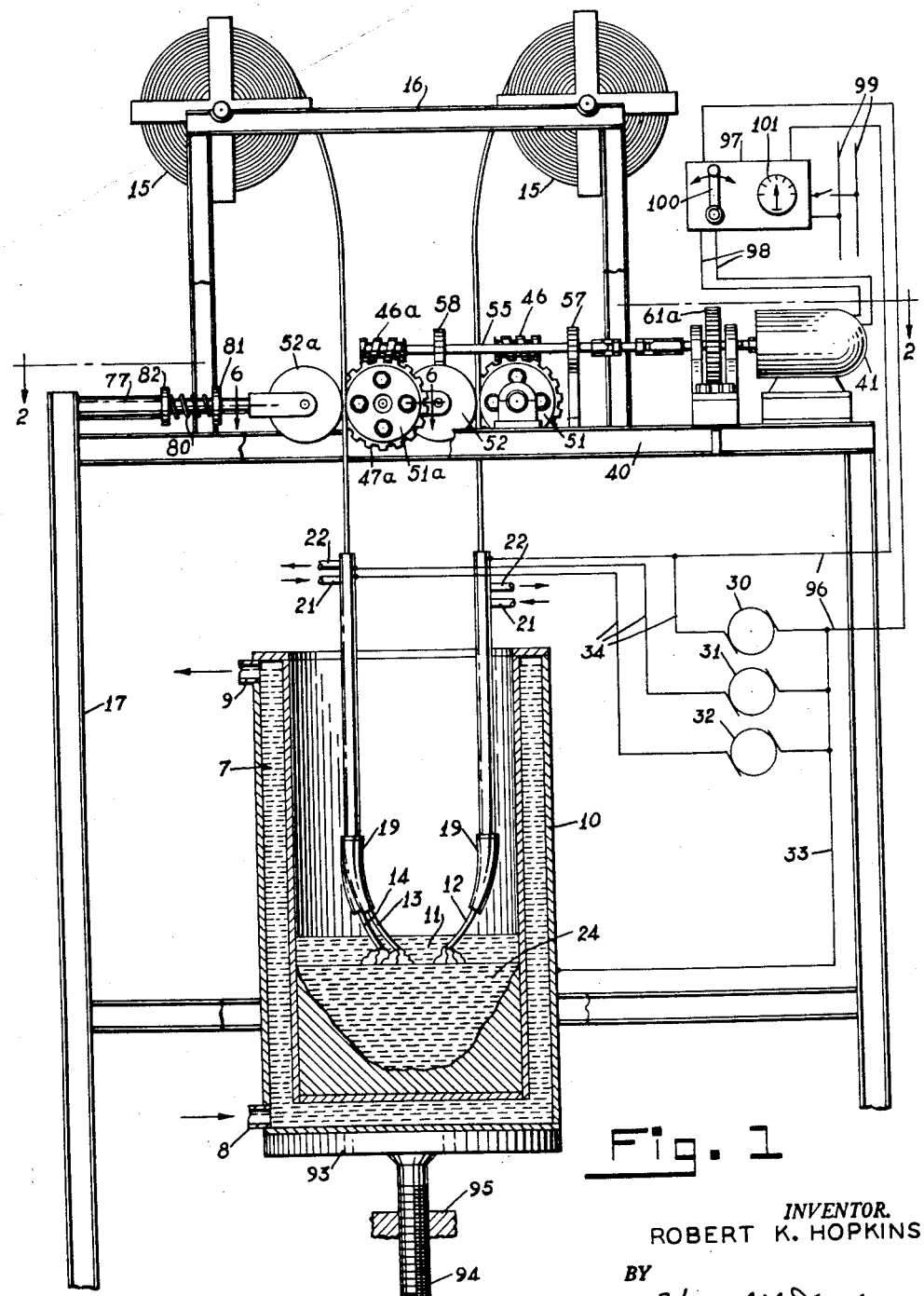
Fig. 1 is a diagrammatic view partly in vertical section and partly in front elevation of an apparatus embodying the present invention.

Referring to the drawings, the apparatus of the present invention progressively produces metal of the desired analysis in a mold 10, in a manner to be described, and deposits this metal as it is produced under a protective layer 11 of molten flux and in said mold, where it progressively solidifies into the desired shape. The mold 10 may be of any suitable design, and in the specific form shown, it has the shape of an upright cylinder for casting ingots. The mold 10 may be of suitable material, such as refractory material or metal and in the form shown, it is of copper and has a jacket 7 with inlet 8 and outlet 9 to permit circulation of a cooling medium, such as water, in heat exchange relationship with its internal walls.

The metal is produced in the mold 10 by the fusing action of electric current discharges from consumable electrodes, shown in the form of slender rods or wires 12, 13 and 14, three being shown for the purpose of illustration, but any number more than one being contemplated, according to the desired composition of the metal to be produced. Each of these wires contains some of the base metal and other ingredients required for the metal to be produced. The compositions of the wires 12, 13 and 14 are desirably different, although it is conceivable in accordance with the present invention, to have two or more wires of the same composition, especially where the metal to be produced requires comparatively large amounts of ingredients contained in this composition.

The electrode wires 12, 13 and 14 are supplied from respective spools or reels 15 supported for free rotation on the superstructure 16 of a frame 17 and extend through respective guide and current contactor tubes 19. The contactor guide tubes 19 are desirably arranged in the mold 10 equal distances apart, and are supported therein in any suitable manner (not shown). To prevent their rapid destruction by the intense heat developed in the mold 10, the tubes 19 have respective jackets with inlets 21 and outlets 22 for circulation of a cooling medium such as water.

The lower ends of the contactor guide tubes 19 are desirably curved inwardly to bring the electrode wires 12, 13 and 14 close together in the flux 11 within a concentrated heating zone and to assure good electrical contact between the wires and their respective tubes 19 adjacent the lower ends thereof. The lower ends of the electrode wires 12, 13 and 14 dip into the flux 11 and produce current discharges beneath the surface thereof across the gaps separating said wires from the metal 24 which is produced from the fusion of these wires in the region of said gaps and which is deposited in the mold 10 beneath the surface of said flux.

The flux layer 11 protects the deposited metal 24 against atmospheric contamination, prevents rapid dissipation of heat from said metal during its solidification, and absorbs or floats out as slag the impurities in the metal. The flux 11 for that purpose may be of any suitable composition having the necessary metallurgical and chemical properties for carrying out the process, and may for that purpose comprise some suitable form of silicate.

The electric power for creating the necessary electric current discharges is derived from generators 30, 31 and 32, which desirably correspond in number to the number of electrode wires 12, 13 and 14 employed, and each of which may constitute part of a motor-generator set. One side of all of these generators is electrically connected or grounded to the mold 10 by a line 33, while the other side of each generator is connected by a line 34 to a respective contactor guide tube 19 for conduction of current to the corresponding electrode wires 12, 13 and 14.

The generators are preferably D. C. as with D. C. the metal producing operation is more stable, but, in accordance with certain aspects of the invention, the generators may be A. C.

As the electrode wires 12, 13 and 14 are continuously fused and consumed in the flux 11, it is necessary to continuously feed these wires endwise, depending on the rate of their consumption, to maintain the current discharges from the ends of said wires substantially constant in voltage or other electrical characteristics. For that purpose, there is provided on the frame 17 above the mold 10 a platform 40 supporting the wire feed mechanism embodying the present invention. The wire feed mechanism comprises a single drive motor 41, supported at one end of the platform 40 substantially midway between the sides thereof, directly driving a shaft 42 supported in bearings, including a bearing 43. The driving shaft 42 drives the wire feed device 44 for the electrode wire 12 through a speed reduction gearing 45, shown comprising a worm 46 on said shaft 42 meshing with a worm wheel 47 on a shaft 48 which is supported in bearings 50 on the platform 40 and which extends crosswise of said platform. Connected to the worm wheel 47 for rotation therewith on one side of the electrode wire 12 and constituting part of the wire feed device 44 is a wire feed roller 51 having a peripheral groove for conformably receiving in feed engagement, the electrode wire 12. On the other side of the electrode wire 12, in peripheral engagement therewith and constituting another part of the wire feed device 44, is a spring-pressed idler roller 52. The wire feed device 44 for the wire 12 is similar to the feed device 44ª for the electrode wire 13, shown in Fig. 6, and its details will be more apparent from the description hereinafter of said feed device 44ª.

With the arrangement so far described, the electrode wire 12 is fed continuously towards the flux submerged fusing zone in accordance with the speed of the drive motor 41. To feed the other electrode wires 13 and 14 from the drive motor 41, but at predetermined rates relative to the feed rate of the electrode wire 12, there is provided a pair of countershafts 55 and 56 on opposite sides of the drive shaft 42, each journalled in bearings 57 and 58 and each connected at one end to the input member of the corresponding wire feed device 44ª or 44ᵇ for the electrode wires 13 and 14 respectively. Between the shaft 42 and the countershaft 55 is a transmission comprising a gear 60 on said shaft 42, meshing with a gear 61ª on a stub shaft 62ª journalled in a bearing bracket 63ª mounted adjustably on the platform 40, for the purpose to be made apparent. The stub shaft 62ª drives the countershaft 55 through a connection 64ª, which is of the universal type, for the purpose to be described.

The speed with which the electrode wire 13 is fed depends, therefore, on the speed ratio of the gear transmission 60, 61ª.

In a similar manner, the countershaft 56 for the feed device 44ᵇ is driven from the drive shaft 42 by a transmission, comprising a gear 61ᵇ on a stub shaft 62ᵇ, meshing with the gear 60 on the drive shaft 42 and journalled in a bearing bracket 63ᵇ mounted adjustably on the platform 40. The stub shaft 62ᵇ drives the countershaft 56 through a universal connection 64ᵇ.

The speed with which the electrode wire 14 is fed depends, therefore, on the speed ratio of the gear transmission 60, 61ᵇ.

The feed device 44ª for the electrode wire 13 is driven from the countershaft 55 through a speed reduction gearing, comprising a worm 46ª on said shaft, meshing with a worm wheel 47ª on an overhanging shaft 48ª which is supported in bearing 50ᵃ on the platform 40 and which extends crosswise of said platform. The worm wheel 47ᵃ is retained on the overhanging shaft 48ᵃ, as for example, by a stud 67 (Fig. 6) and has connected thereto for rotation therewith on one side of the electrode wire 13 a wire feed roller 51ᵃ having a peripheral groove 68 for conformably receiving in feed engagement the electrode wire 13. The worm wheel 47ᵃ has the wire feed roller 51ᵃ connected thereto, as for example, by bolt 70 and is insulated therefrom by means of an intervening disc 71 and bolt bushings 72 of non-conducting material.

The wire feed device 44ᵃ comprises on the other side of the wire 13, an idler roller 52ᵃ having a cylindrical periphery in engagement with said wire and supported on a stub shaft or arbor 73. For yieldably pressing the idler roller 52ᵃ against the wire 13, the stub shaft 73 is carried on a yoke or fork 74 at one end of a plunger 75, insulated from said idler roller by a bushing 76 of non-conducting material and telescoping into tube 77 (Figs. 1 and 2) rigidly affixed to a cross frame piece 78 at one end of the platform 40. A spring 80, bearing at one end against a collar 81 rigid with the plunger 75, and bearing at the other end against a plunger embracing collar 82 secured to one end of the tube 77, urges the idler roller 52ᵃ yieldably against the wire 13 to press said wire into feed engagement with the drive feed roller 51ᵃ.

The feed device 44ᵇ for the wire 14 is similar to the feed device 44ᵃ for the wire 13 already described, some parts of said feed device 44ᵇ being indicated in the drawings with numerals which are the same as those of the corresponding parts of the feed device 44ᵃ, but which distinguish therefrom by the subindex letter b. The feed device 44ᵇ is driven from the countershaft 56 through a speed reduction gearing comprising a worm 46ᵇ and worm wheel 47ᵇ as in the case of the feed devices 44 and 44ᵃ.

The feed rates for the wires 13 and 14 with respect to the feed rate of the wire 12 may be changed by changing the gear 61ᵃ or 61ᵇ. Since any changes in the size of the gears 61ᵃ and 61ᵇ moves the axes of these gears transversely of the main drive shaft 42, it is necessary to provide adjustable means for supporting these gears in mesh with the gear 60. For that purpose, the bearing brackets 63ᵃ and 63ᵇ for the shafts of these gears are adjustably mounted. In the case of the bearing bracket 63ᵃ, this bracket is supported on one of the horizontal side frame pieces 85 (Figs. 3 and 4) of the platform 40 through a block 86, which is shown of hollow construction and of rectangular cross-section and which is rigidly secured to said frame piece. The bearing bracket 63ᵃ has one end adjustably secured to this block by means of bolts 87 passing through elongated slots 88 in said bracket and accessible for loosening or tightening action through the open ends of said block. By loosening the bolts 87, the bearing bracket 63ᵃ may be moved crosswise of the platform 40 to bring the new gear 61ᵃ thereon into proper mesh with the drive gear 60. This adjustment of the bearing bracket moves the stub shaft 62ᵃ carrying the gear 61ᵃ transversely with respect to the countershaft 55, and may bring this stub shaft out of axial alignment with said countershaft. To maintain a drive between the two shafts 55 and 62ᵃ irrespective of the relative positions of their axes, the connection 64ᵃ is a universal one of any suitable type. In the specific form shown, this connection comprises a connecting piece 90 with a universal swivel end attachment to the adjacent end of the countershaft 55 and with a universal swivel end attachment to the adjacent end of the stub shaft 62ᵃ effected through an intervening forked sleeve 91 embracing said stub shaft and keyed thereto (Fig. 5) in a manner to permit said shaft to be released from said sleeve when it is desired to change the gear 61ᵃ.

In Fig. 2, the gear 61ᵃ is shown of such size, that the axis thereof is in alignment with the countershaft 55. In Figs. 3 and 4, the position of the bearing bracket 63ᵃ, corresponding to the set-up of Fig. 2, is shown in dot and dash lines. In Fig. 3, the position of the new gear 61ᵃ replacing the smaller gear 61ᵃ of Fig. 2, to reduce the speed of feed of the wire 13 with respect to the speed of feed of the wire 12, is shown in full lines and in Figs. 3 and 4 the corresponding adjusted position of the bearing bracket 63ᵃ is shown in full lines. This adjusted set-up throws the stub shaft 62ᵃ and the countershaft 55 out of axial alignment as shown, but the universal connection 64ᵃ accommodates itself angularly to this shaft misalignment. The slide key fit between the sleeve 91 and the stub shaft 62ᵃ permits this sleeve to accommodate itself axially according to the angularity of the connection 64ᵃ.

The bearing bracket 63ᵇ and the universal connection 64ᵇ associated with the feed for the electrode wire 14, are similar to the bearing bracket 63ᵃ, and the universal connection 64ᵃ respectively associated with the feed for the electrode wire 13 already described.

As the metal is produced and deposited in the mold 10, the level of the metal rises therein. Suitable means are provided for moving the mold 10 continuously downwardly with respect to electrode wires 12, 13 and 14 and at uniform speed, depending on the rate of metal production in said mold, to maintain the positional relationship between the surface of the deposited metal and the discharge ends of said electrode wires substantially constant. In the specific form shown, this mold moving means comprises a platform 93 (Fig. 1), on which the mold 10 is supported, connected to an upright feed screw 94. A motor (not shown) moves the feed screw 94 axially through a drive, comprising a worm (not shown) meshing with a worm wheel 95 threaded on said feed screw and held against axial movement in any suitable manner, so that upon rotation of said worm wheel, the feed screw is moved axially to cause corresponding movement of the mold. As an alternative the mold 10 can be held stationary and platform 40 raised as the level of the metal in mold 10 rises.

With the arrangement so far described, the three electrode wires 12, 13 and 14 as they are consumed are fed into the current discharge fusing zone of the flux 11 through the operation of the single motor 41 and at selective relative rates depending on the desired analysis of the metal to be produced, this rate being determined by the sizes of the replaceable gears 61ᵃ and 61ᵇ. Any variation in the speed of the motor 41 will correspondingly vary the speed of feed of the electrode wires 12, 13 and 14, but will not affect their relative rates of feed, so that the analysis of the metal being produced during any single casting operation will remain substantially constant.

The motor 41 is controlled in accordance with the desired rate of metal production and the desired characteristic of current discharge. This control of the motor 41 can be effected from the current discharge characteristics of all the wires or may be effected from the current discharge characteristics of only one wire, as specifically shown. To that end, there is electrically connected across the generator 30 by means of wires 96, a control device or head 97 electrically connected to the motor 41 by wires 98 to regulate current to said motor from a supply source 99. The control head senses a specific characteristic of the current discharge across the gap between the flux submerged end of the eelctrode wire 12 and the deposited molten metal 24, and by regulating the speed of the motor 41 serves to maintain that characteristic substantially constant. The characteristic of the current discharge to be sensed by the control head 97 is desirably the voltage across the current discharge gap and for that purpose, this control head may be of any suitable well-known type. For example, it may be of the so-called "Unionmelt" electronic type or of the "Amplidyne" motor-generator type, and is shown provided with a handle 100 for manually setting the desired voltage across the current discharge gap, and a meter 101 indicating said voltage. The voltage to which the control head 97 is set depends on a number of factors, as for example, on the desired rate of production of the metal, the character of the electrode wires, and the desired rate of solidification of the metal deposited in the mold 10. Once the control head 97 has been set to the desired condition, these will be maintained automatically by the control of the speed of the motor 41.

Since the speed of the motor 41 is controlled from the wire 12, the generators 31 and 32 must be set in any well-known manner to a predetermined relationship with respect to the generator 30, in order that the desired characteristics of the current discharge from the other wires 13 and 14 are maintained, or if desired, the control head 97 may be of a type and may be connected to sense the current discharge characteristics of all the electrode wires.

Also, if desired, instead of effecting the control of electrode wire feed automatically, as far as certain aspects of the invention are concerned, this control may be effected manually by manually controlling the speed of the motor to keep the voltage across the current discharge gap associated with any electrode wire at a selected point.

Also, as far as certain aspects of the invention are concerned, the speed of the motor 41 may be kept constant, and the amperage to the electrode wire or wires varied to maintain substantially constant consumption or burn-off rate.

While the invention has been described with particular reference to a specific embodiment, it is to be understood that it is not to be so limited thereto but is to be construed broadly and restricted solely by the scope of the appended claims.

What is claimed is:

1. In an apparatus for producing metal by the fusing action of flux submerged current discharges on consumable electrodes containing base ingredients of the metal to be produced and for depositing the produced metal in a mold below a blanket of flux, the combination comprising a motor, a pair of devices for feeding respective consumable electrodes towards the fusing zone in said blanket of flux as said electrodes are consumed, and a pair of drive means between said motor and said electrode feeding devices respectively, for operating said feeding devices simultaneously at predetermined relative rates, one of said drive means including a transmission changeable to alter its speed ratio selectively, whereby the relative rates of electrode feeds may be changed selectively.

2. In an apparatus for producing metal by the fusing action of flux submerged current discharges on consumable electrodes containing base ingredients of the metal to be produced and for depositing the produced metal in a mold below a blanket of flux, the combination comprising a motor, a pair of devices for feeding respective consumable electrodes towards the fusing zone in said blanket of flux as said electrodes are consumed, and a pair of drive means between said motor and said electrode feeding devices respectively, for operating said feeding devices simultaneously at predetermined relative rates, one of said drive means including a gear transmission having a gear and means for supporting said gear in operative position, said gear being adapted to be replaced by a gear of different size to change the speed ratio of said transmission, and said gear supporting means being adjustable to support the replacing gear in operative position, whereby the relative rates of electrode feeds may be changed selectively.

3. In an apparatus for producing metal by fusing action of flux submerged current discharges on consumable electrodes containing base ingredients of the metal to be produced and for depositing the produced metal in a mold below a blanket of flux, the combination comprising a motor, a shaft connected to said motor, a feed device for a consumable electrode, drive means between said shaft and said feed device adapted to drive said feed device, a second feed device for another consumable electrode, and a drive between said shaft and said second feed device comprising a gear on said shaft, a second gear meshing therewith and a bearing bracket for said second gear, said second gear being replaceable by a gear of different size to change the speed ratio between said gears, and said bearing bracket being adjustable to bring the second gear into operative mesh with said first gear regardless of the size of said second gear within a limited range, whereby the relative electrode feeds may be changed selectively.

4. In an apparatus for producing metal by the fusing action of flux submerged current discharges on consumable electrodes containing base ingredients of the metal to be produced and for depositing the produced metal in a mold below a blanket of flux, the combination comprising a motor, a pair of devices for feeding respective consumable electrodes towards the fusing zone in said blanket of flux as said electrodes are consumed, and a pair of drive means between said motor and said electrode feeding devices respectively, for operating said feeding devices simultaneously at predetermined relative rates, one of said drive means including a first shaft, a second shaft driven from said first shaft, an adjustable bearing bracket for said first shaft, a universal connection between said shafts permitting adjustments in the position of said first shaft relative to said second shaft transversely of their axes upon adjustment of said bearing bracket, while maintaining drive connection between said shafts, and a transmission including a pair of intermeshing gears, the driven gear being carried on said first shaft, one of said gears being replaceable by a gear of a different size to change the speed ratio of said transmission, whereby the relative rates of electrode feeds may be changed selectively.

5. In an apparatus for producing metal by the fusing action of flux submerged current discharges from consumable electrode wires containing base ingredients of the metal to be produced and for depositing the produced metal in a mold below a blanket of flux, the combination comprising means for supporting a plurality of electrode wire reels or spools for free supply rotation, a motor, a plurality of devices for feeding the respective wires from said reels towards the fusing zone in said blanket of flux as said electrode wires are consumed, and a plurality of drive means between said motor and said electrode feeding devices respectively for operating said feeding devices simultaneously at predetermined relative rates, each of said drive means except one including a transmission changeable to alter its speed ratio selectively, whereby the relative rates of electrode wire feeds may be changed selectively.

6. In an apparatus for producing metal by the fusing action of flux submerged current discharge and casting it in a mold adapted to contain a layer of flux, comprising a platform disposed above said mold, means on said platform for supporting a plurality of electrode wire reels for free supply rotation above said mold, a motor on said platform, a device on said platform for feeding one of the wires from its corresponding reel towards the fusing zone in said mold as said wire is consumed, a device between said motor and said feeding device comprising a main drive shaft connected to the shaft of said motor, one or more additional devices on said platform for feeding the other wire or wires respectively from the corresponding reel or reels towards the fusing zone in said mold as said wire or wires are consumed, and a drive between said main drive shaft and each of said additional feeding devices, comprising a countershaft extending substantially parallel to said main drive shaft, a drive gear on said main drive shaft, a driven gear meshing with said drive gear, a shaft for said driven gear, a bearing bracket for said latter gear shaft, and a universal connection between said gear shaft and said countershaft, said driven gear being replaceable by a gear of different size to alter the speed ratio between said gears, said bearing bracket being adjustable to permit replacement of said driven gear by another driven gear of different size into mesh with said gear, and said universal connection permitting the displacement of said gear shaft with respect to said countershaft resulting from change in said driven gear.

ROBERT K. HOPKINS.

REFERENCES CITED

The following references are of record in the file of this patent:

UNITED STATES PATENTS

| Number | Name | Date |
|---|---|---|
| 1,707,433 | Hand | Apr. 2, 1929 |
| 2,385,206 | Hopkins | Sept. 18, 1945 |
| 2,436,387 | Harter et al. | Feb. 24, 1948 |